United States Patent
Jewart et al.

(10) Patent No.: US 9,618,821 B2
(45) Date of Patent: Apr. 11, 2017

(54) OPTICAL MODULATOR

(71) Applicant: Lumentum Operations LLC

(72) Inventors: Charles M. Jewart, Enfield, CT (US); Yannick Lize, San Jose, CA (US); Karl Kissa, Gilroy, CA (US)

(73) Assignee: Lumentum Operations LLC, Milpitas, CA (US)

(*) Notice: Subject to any disclaimer, the term of this patent is extended or adjusted under 35 U.S.C. 154(b) by 0 days.

(21) Appl. No.: 14/732,041

(22) Filed: Jun. 5, 2015

(65) Prior Publication Data

US 2016/0357086 A1    Dec. 8, 2016

(51) Int. Cl.
*G02F 1/225*    (2006.01)
*G02F 1/21*    (2006.01)

(52) U.S. Cl.
CPC ...... *G02F 1/2257* (2013.01); *G02F 2001/212* (2013.01); *G02F 2001/217* (2013.01)

(58) Field of Classification Search
None
See application file for complete search history.

(56) References Cited

U.S. PATENT DOCUMENTS

| 8,295,710 B2 | 10/2012 | Marcus | |
| 2013/0209112 A1* | 8/2013 | Witzens | G02B 6/2813 398/214 |
| 2015/0241633 A1* | 8/2015 | Kusaka | G02B 6/125 385/1 |

OTHER PUBLICATIONS

Soldano et al., "Planar Monomode Optical Couplers Based on Multimode Interference Effects", Journal of Lightwave Technology, vol. 10, No. 12, Dec. 1992, 8 pages.
Soldano et al., "Optical Multi-Mode Interference Devices Based on Self-Imaging: Principles and Applications", Journal of Lightwave Technology, vol. 13, No. 4, Apr. 1995, pp. 615-627.
Seyringer, "Low Loss and High Uniformity Multimode Interference Splitter Operating in a Wide Wavelength Band", Research Centre of Microtechnology, The 9th International Conference on Optical Communications and Networks, Oct. 2010, pp. 383-386.
Latunde-Dada et al., "Theory and Design of Adiabatically Tapered Multimode Interference Couplers", Journal of Lightwave Technology, vol. 25, No. 3, Mar. 2007, pp. 834-839.
Hanfoug et al., "Reduced reflections from multimode interference couplers", Electronics Letters, vol. 42, No. 8, Apr. 13, 2006, 2 pages.
Jenkins et al., "Novel 1×N and N×N integrated optical switches using self-imaging multimode GaAs/AlGaAs waveguides", Defence Research Agency (DRA), Electronics Division, Sep. 24, 1993, pp. 684-686.
Hanfoug et al., "A Multimode Interference coupler with low reflections", Proceedings Symposium IEEE/LEOS Benelux Chapter, 2005, 4 pages.

\* cited by examiner

*Primary Examiner* — Jerry Rahll
(74) *Attorney, Agent, or Firm* — Harrity & Harrity, LLP

(57) ABSTRACT

An optical modulator is disclosed, in which a MMI couplers are used for input signal splitting for branching into individual Mach-Zehnder interferometers, as well as for branching and combining from individual Mach-Zehnder waveguides. MMI couplers, splitters, and combiners may be cascaded and combined with single-mode Y-splitters and combiners to provide modulators of various types, including dual polarization, quadrature phase Mach-Zehnder interferometer base optical modulators.

26 Claims, 12 Drawing Sheets

OPTICAL MODULATOR

TECHNICAL FIELD

The present disclosure relates to optical communications equipment, and in particular to optical modulators.

BACKGROUND

In an optical communication system, optical signals are encoded with digital streams of information and transmitted through a series of optical fiber spans towards a receiver end, where the optical signals may be decoded to retrieve or re-generate the digital streams of information in electronic domain. The encoding is typically performed by modulating the optical signals in phase, amplitude, or both. Mach-Zehnder (MZ) waveguide interferometers are often used to modulate optical signals in amplitude and/or phase.

Referring to FIG. 1, a prior-art optical modulator 100 may include first 101 ("X") and second 102 ("Y") modulation branches. Each modulation branch may include a pair of MZ waveguide interferometers 110 for in-phase ("I") and in-quadrature ("Q") modulation. First 111, second 112, and third 113 Y-splitters may be used to split an incoming optical signal 104 into four equal portions. First 121 and second 122 Y-combiners are used to recombine the optical signal 104 into an "output X" branch 131 (modulated light 105X) and an "output Y" branch 132 (modulated light 105Y) for coupling to an optical polarization rotator/combiner, not shown. The modulation configuration of the optical modulator 100 is termed a "Dual-Polarization, Quad Parallel Mach-Zehnder" (DP-QPMZ) modulation configuration.

One drawback of the prior-art DP-QPMZ optical modulator 100 is a comparatively large size, and associated high cost. Due to their geometry, the Y-splitters 111-113 and the Y-combiners 121, 122 of the optical modulator 100 typically occupy large area on a modulator chip. A requirement to have optical taps at different locations of the optical modulator 100 may result in a further size increase of the optical modulator 100.

SUMMARY

In accordance with an aspect of the disclosure, input optical signal splitting of a planar lightwave optical modulator may be at least partially performed by one or more multimode interference (MMI) couplers, which may result in cost and size reduction. The signal combining may be optionally performed by MMI coupler(s). Output ports may be provided in the MMI couplers for optical taps. Single-mode Y-couplers may be used for further optical signal splitting and/or combining, where a precise amplitude splitting of the optical signal is required.

In accordance with the disclosure, there is further provided an optical modulator comprising:

a 1×2 multimode interference splitter having an input port for receiving light, and first and second output ports for outputting light;

first and second waveguides optically coupled to the first and second output ports, respectively;

a single-mode Y-combiner having first and second ingress ports optically coupled to the first and second waveguides, respectively, and an egress port; and a phase shifter operationally coupled to the first waveguide, for modulating optical phase of light propagating in the first waveguide.

In accordance with an aspect of the disclosure, there is provided an optical modulator comprising:

an optical splitter comprising an input port for receiving light, first to fourth output ports for outputting light, and a multimode interference optical splitter downstream of the input port for splitting the light received at the input port;

first and second Mach-Zehnder interferometers, each comprising:

first and second waveguides each optically coupled to a different one of the first to fourth output ports;

a Mach-Zehnder combiner comprising: first and second ingress ports optically coupled to the first and second waveguides, respectively; and a first egress port; and a phase shifter operationally coupled to the first waveguide, for modulating optical phase of light propagating in the first waveguide; and a first optical combiner comprising: first and second inlet ports each optically coupled to a different one of the first egress ports of the Mach-Zehnder combiners of the first and second Mach-Zehnder interferometers; and a first outlet port for outputting the light modulated by the phase shifters of the first and second Mach-Zehnder interferometers.

In one exemplary embodiment, the optical splitter may further include fifth to eighth output ports for outputting light, wherein the multimode interference optical splitter is further configured for splitting at least a portion of the light received at the input port between the fifth to eighth output ports, the optical modulator further comprising:

third and fourth Mach-Zehnder interferometers, each comprising:

first and second waveguides each optically coupled to a particular one of the fifth to eighth output ports;

a Mach-Zehnder combiner comprising: first and second ingress ports optically coupled to the first and second waveguides, respectively; and a first egress port; and a phase shifter operationally coupled to the first waveguide, for modulating optical phase of light propagating in the first waveguide; and a second optical combiner comprising: first and second inlet ports each optically coupled to a particular one of the first egress ports of the Mach-Zehnder combiners of the third and fourth Mach-Zehnder interferometers; and a first outlet port for outputting the light modulated by the phase shifters of the third and fourth Mach-Zehnder interferometers.

In accordance with an embodiment of the disclosure, there is further provided an optical modulator comprising:

a 1×N multimode interference optical splitter comprising an input port for receiving light and first to $N^{th}$ output ports for outputting light, for splitting the light received at the input port, wherein N is an integer;

first through $(N/2)^{th}$ Mach-Zehnder interferometers, each comprising:

first and second waveguides each optically coupled to a different one of the first to $N^{th}$ output ports; and a first phase shifter operationally coupled to the first waveguide, for modulating optical phase of light propagating in the first waveguide; and a plurality of optical combiners, each comprising: a plurality of inlet ports each optically coupled to a different one of the first and second waveguides of the first through $(N/2)^{th}$ Mach-Zehnder interferometers; and a first outlet port for outputting at least a portion of the light modulated by the first phase shifters of the corresponding Mach-Zehnder interferometers.

In one exemplary embodiment, the plurality of optical combiners comprises first and second optical combiners each comprising N/2 inlet ports.

Each of the plurality of optical combiners may include a second outlet port for outputting at least a portion of the light modulated by the first phase shifters of the corresponding Mach-Zehnder interferometers. In this embodiment, the optical modulator may further include a plurality of photodetectors each coupled to a different one of the second outlet ports of the plurality of optical combiner.

BRIEF DESCRIPTION OF THE DRAWINGS

Exemplary embodiments will now be described in conjunction with the drawings, in which.

DETAILED DESCRIPTION

Figure 1:
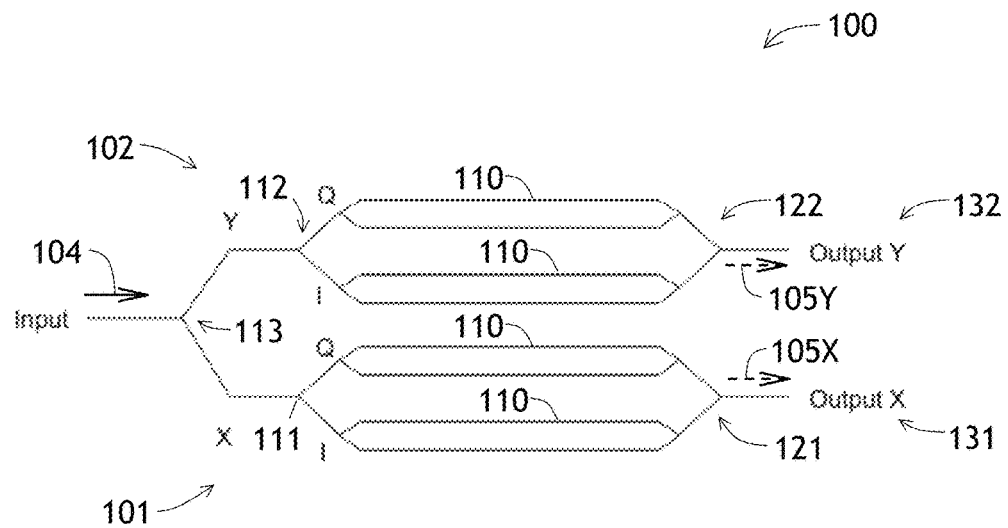
FIG. 1 illustrates a schematic view of a prior-art DP-QPMZ optical modulator.

While the present teachings are described in conjunction with various embodiments and examples, it is not intended that the present teachings be limited to such embodiments. On the contrary, the present teachings encompass various alternatives and equivalents, as will be appreciated by those of skill in the art. In FIGS. 3 to 10A-F, similar elements are denoted by similar reference numerals.

Figure 2A:
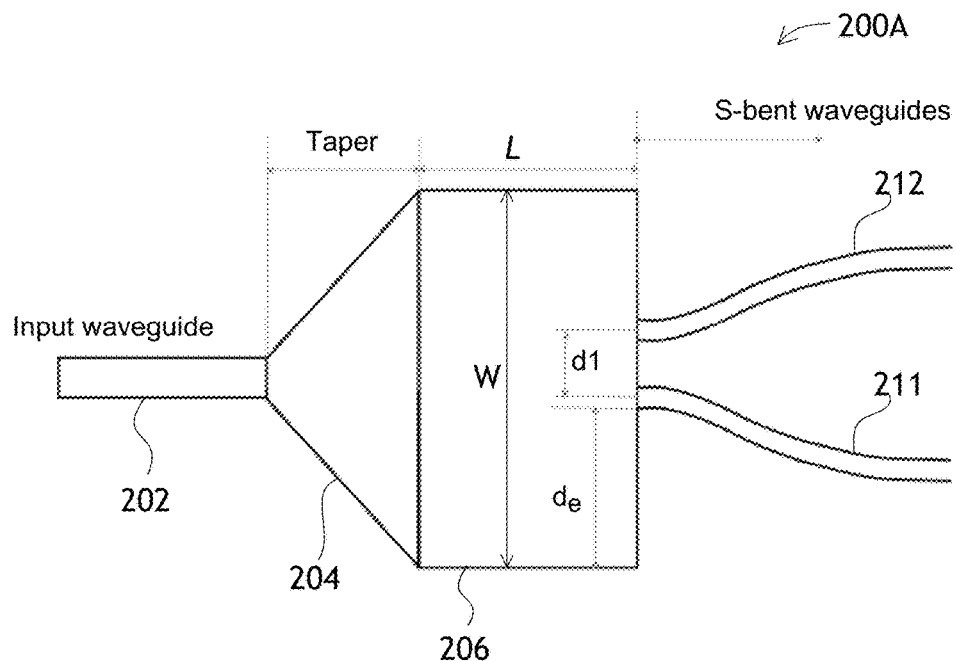
FIG. 2A illustrates a schematic view of a 1×2 MMI splitter.

In accordance with the present disclosure, a 1×N multimode interference (MMI) splitter may be used to split an input optical signal into a required number N of portions for subsequent modulation. Various types of MMI splitters, usable in optical modulators of the present disclosure, will be considered first. Referring to FIG. 2A, a 1×2 MMI splitter 200A may include an input waveguide 202, a taper section 204, a multimode interference section 206, and first 211 and second 212 output waveguides. The splitting ratio may be defined by selecting width W and length L of the multimode interference section 206, as well as waveguide spacing $d_1$ and edge distance $d_e$ of the first 211, and second 212 output waveguides. For 50:50 splitting ratio, the 1×2 MMI splitter 200 may be symmetrical as shown. The 1×2 MMI splitter 200A dimensions, e.g. the width W, the length L, etc., as well as shape and length of the taper section 204, may be selected to minimize optical loss through the MMI splitter. The taper section 204 may expand linearly, exponentially, quadratically, etc., in going from the input waveguide 202 to the multimode interference section 206.

Figure 2B:
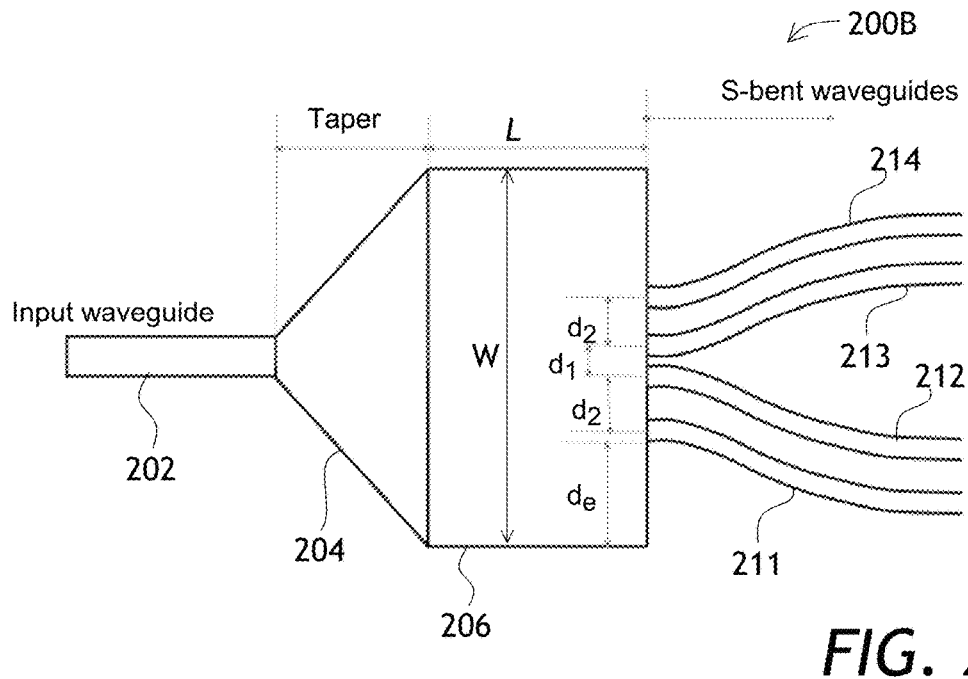
FIG. 2B illustrates a schematic view of a 1×4 MMI splitter.
Figure 2C:
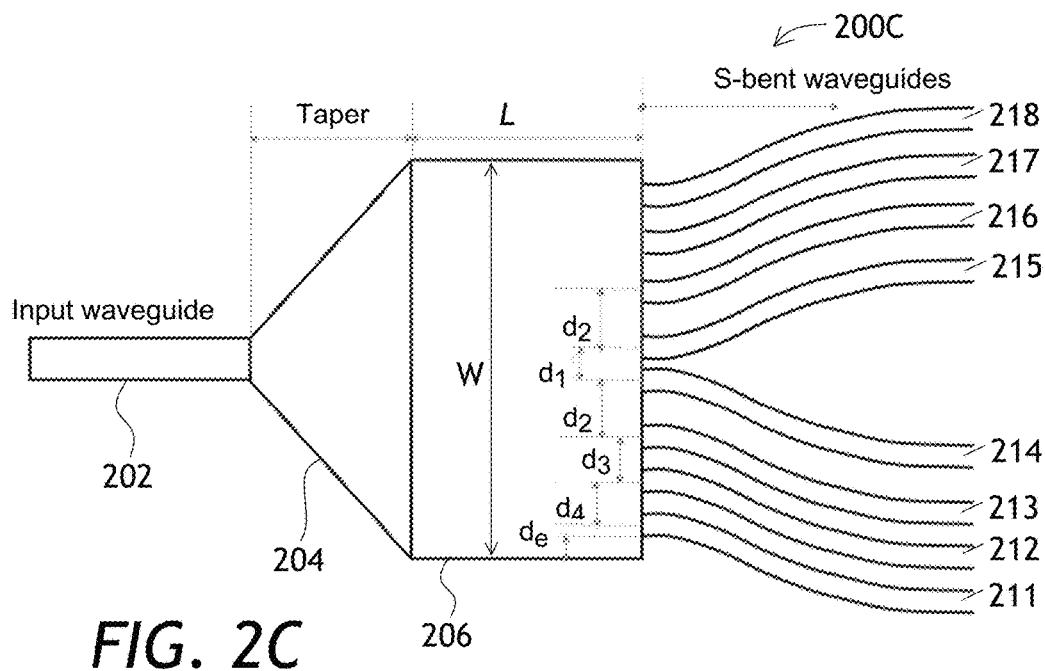
FIG. 2C illustrates a schematic view of a 1×8 MMI splitter.
Figure 2D:
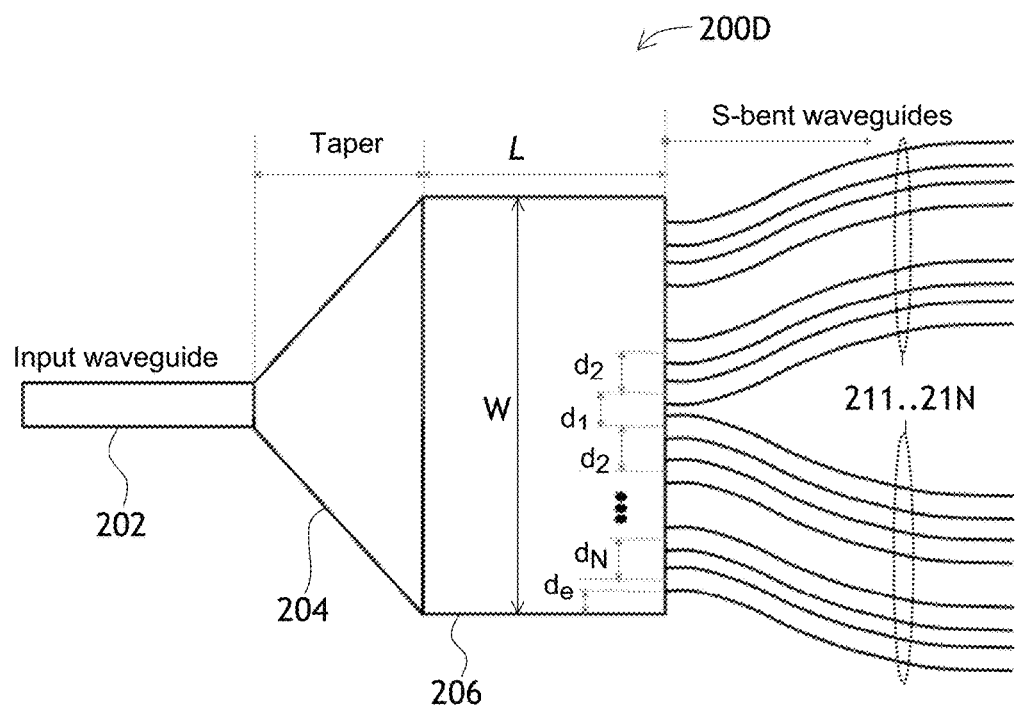
FIG. 2D illustrates a schematic view of a 1×N MMI splitter.

Referring to FIGS. 2B, 2C, and 2D with further reference to FIG. 2A, a 1×4 MMI splitter 200B (FIG. 2B), a 1×8 MMI splitter 200C (FIG. 2C), and a generic 1×N MMI splitter 200D (FIG. 2D) are similar to the 1×2 MMI splitter 200A of FIG. 2A, differing in number and position of the output waveguides 211, 212, 213, 214, 215, 216, 217, 218, . . . 21N, the width W, and the length L. For instance, the 1×4 MMI splitter 200B (FIG. 2B) has four output waveguides 211-214; the 1×8 MMI splitter 200C (FIG. 2C) has eight output waveguides 211-218; and the 1×N MMI splitter 200D (FIG. 2D) has N output waveguides 211-21N. The splitting properties of the MMI splitter 200B, the 1×8 MMI splitter 200C, and the 1×N MMI splitter 200D may be defined by selecting the respective widths W and length L of the respective multimode interference sections 206, as well as distances $d_1$, $d_2$, $d_3$, and $d_4$ between the output waveguides 211 to 218 as shown in FIGS. 2A-2D, and the edge distance $d_e$, and the taper 204 shape and length In FIGS. 2A to 2D, the taper section 204 is optional.

Figure 3:
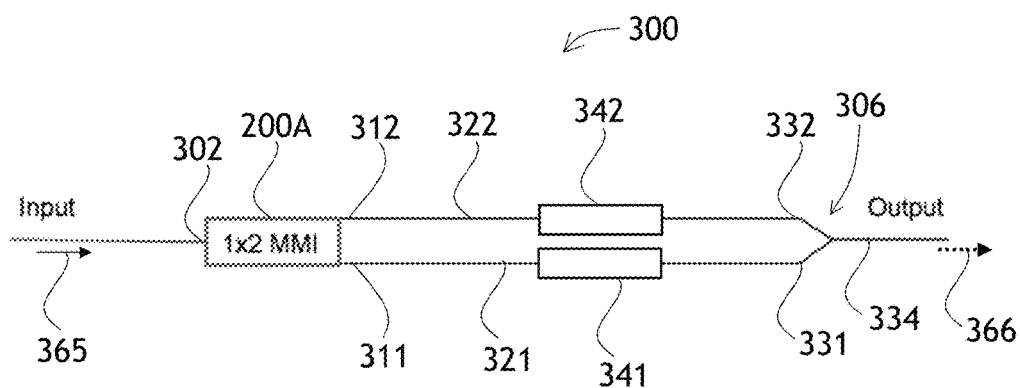
FIG. 3 illustrates a schematic view of a MZ waveguide interferometer including a 1×2 MMI splitter.

Referring now to FIG. 3 with further reference to FIG. 2A, an optical modulator 300 (FIG. 3) may include the 1×2 MMI splitter 200A (FIG. 2A) having an input port 302 (FIG. 3) for receiving light 365, and first 311 and second 312 output ports for outputting portions the light 365. First 321 and second 322 waveguides may be optically coupled to the first 311 and second 312 output ports, respectively. A Y-combiner, e.g. a single-mode Y-combiner 306 having first 331 and second 332 ingress ports and an egress port 334, may be provided. The first 331 and second 332 ingress ports may be optically coupled to the first 321 and second 322 waveguides, respectively. A first phase shifter 341 may be operationally coupled to the first waveguide 321 for modulating optical phase of a portion of the light 365 propagating in the first waveguide 321. An optional second phase shifter 342 may be operationally coupled to the second waveguide 322 for modulating optical phase of a portion of the light 365 propagating in the second waveguide 322. When the first 341 and second 342 phase shifters operate in phase, modulated light 366 may be modulated in phase. When the first 341 and second 342 phase shifters operate in counter-phase, the modulated light 366 may be modulated in amplitude.

Figure 4:
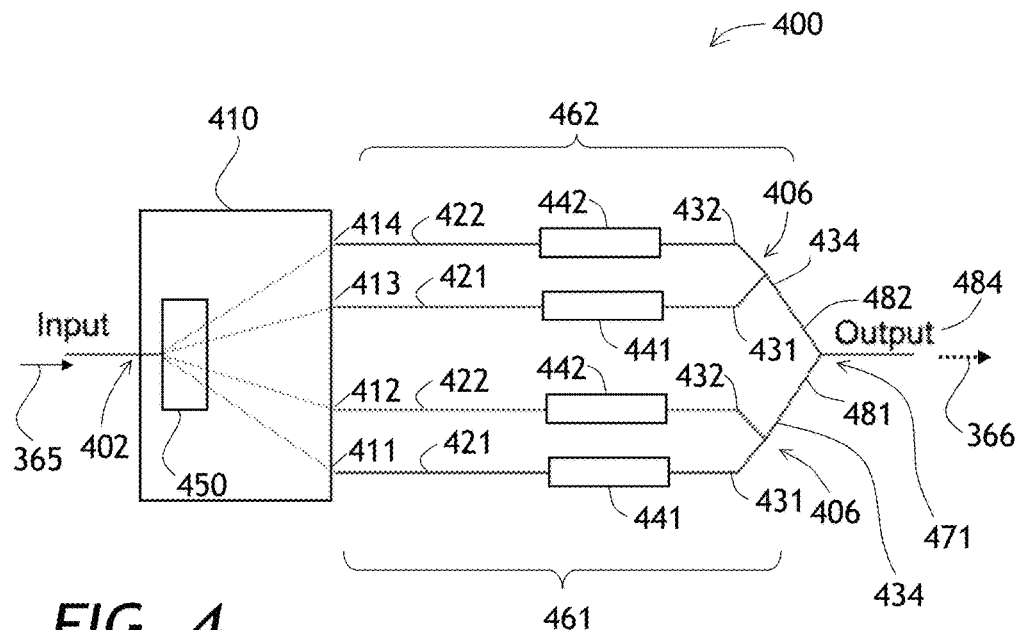
FIG. 4 illustrates a schematic view of a QPMZ optical modulator including a pair of the MZ waveguide interferometers.

Referring to FIG. 4, an optical modulator 400 may generally include an optical splitter 410 having an input port 402 for receiving the light 365, first 411, second 412, third 413, and fourth 414 output ports for outputting portions of the light 365, and a MMI optical splitter 450 disposed downstream of the input port 402, for splitting the light 365 received at the input port 402. As will be illustrated in more specific embodiments further below, the number of output ports of the optical splitter 410, and the number of output ports of the MMI optical splitter 450 may vary.

The optical modulator 400 may further include first 461 and second 462 Mach-Zehnder interferometers, which are preferably identical to each other. Each of the Mach-Zehnder interferometer 461 and 462 may include first 421 and second 422 waveguides each optically coupled to a different one of the first 411 to fourth 414 output ports, a Mach-Zehnder combiner 406 including first 431 and second 432 ingress ports optically coupled to the first 421 and second 422 waveguides, respectively, and a first egress port 434. Each of the Mach-Zehnder interferometers 461 and 462 may further include a first phase shifter 441 operationally coupled to the first waveguide 421, and/or a second phase shifter 442 for modulating optical phase of portions of the light 365 propagating in the respective the first 421 and/or the second waveguides 422. The operation of the phase shifters 441 and 442 is similar to that of the optical modulator 300 of FIG. 3.

The optical modulator 400 of FIG. 4 may further include a first optical combiner 471 including first 481 and second 482 inlet ports each optically coupled to a different one of the first egress ports 434 of the Mach-Zehnder combiners 406 of the first 461 and second 462 Mach-Zehnder interferometers; and a first outlet port 484 for outputting the modulated light 366 modulated by the phase shifters 441 and 442 of the first 461 and second 462 Mach-Zehnder interferometers.

Figure 5:
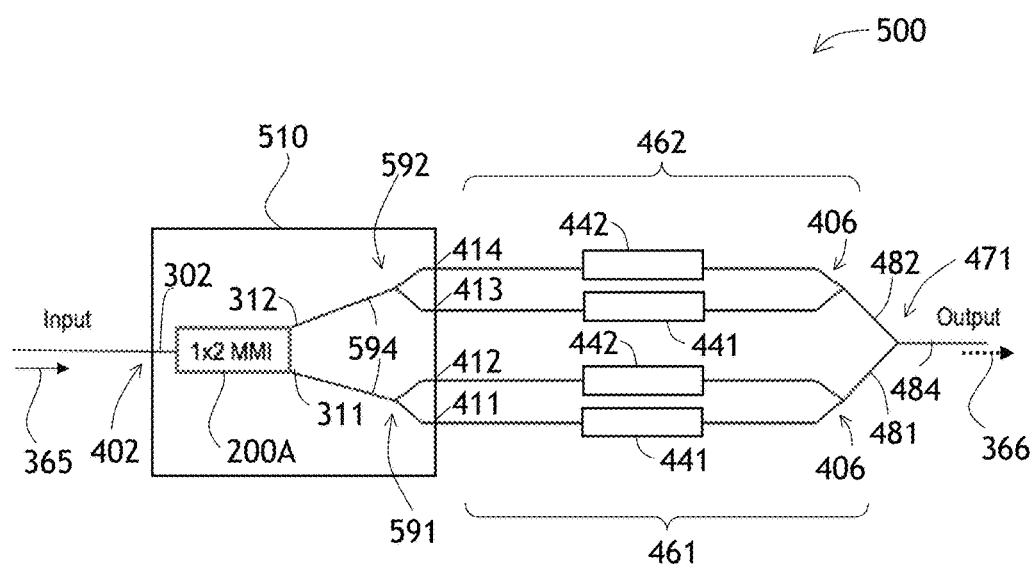
FIG. 5 illustrates a schematic view of an embodiment of a QPMZ optical modulator of FIG. 4, including a 1×2 MMI splitter.

Referring now to FIG. 5 with further reference to FIGS. 2A and 4, an optical modulator 500 (FIG. 5) is an embodiment of the optical modulator 400 (FIG. 4). An input optical coupler 510 (FIG. 5) of the optical modulator 500 is an embodiment of the respective input optical coupler 410 of the optical modulator 400 (FIG. 4). The input optical coupler 510 (FIG. 5) may include the 1×2 MMI splitter 200A (FIG. 2A) optically coupled to the input port 402 (FIG. 5) at its input port 302. The optical splitter 510 of the optical modulator 500 may further include first 591 and second 592 Y-splitters, for example single-mode Y-splitters or MMI 1×2 splitters, each including an ingress port 594 optically coupled to a different one of the first 311 and second 312 output ports of the MMI splitter 200A. The first Y-splitter 591 may include the first 411 and second 412 output ports of the optical splitter 510, and the second Y-splitter 592 may include the third 413 and fourth 414 output ports of the optical splitter 510, as shown in FIG. 5.

Figure 6A:
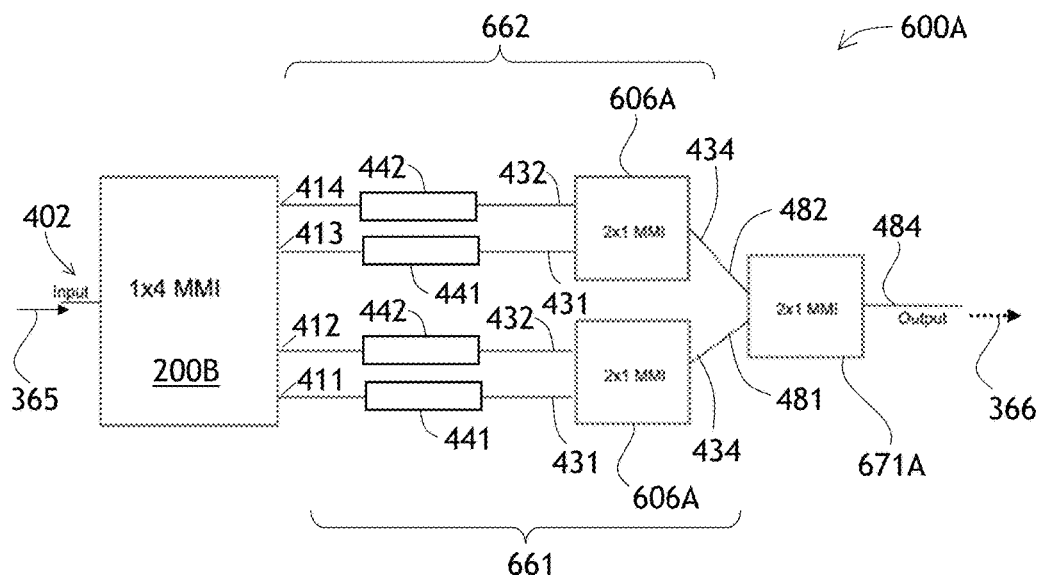
FIGS. 6A, 6B, and 6C illustrate schematic views of embodiments of a QPMZ optical modulator of FIG. 4, including a 1×4 MMZ splitter and various MMI combiners.
Figure 6B:
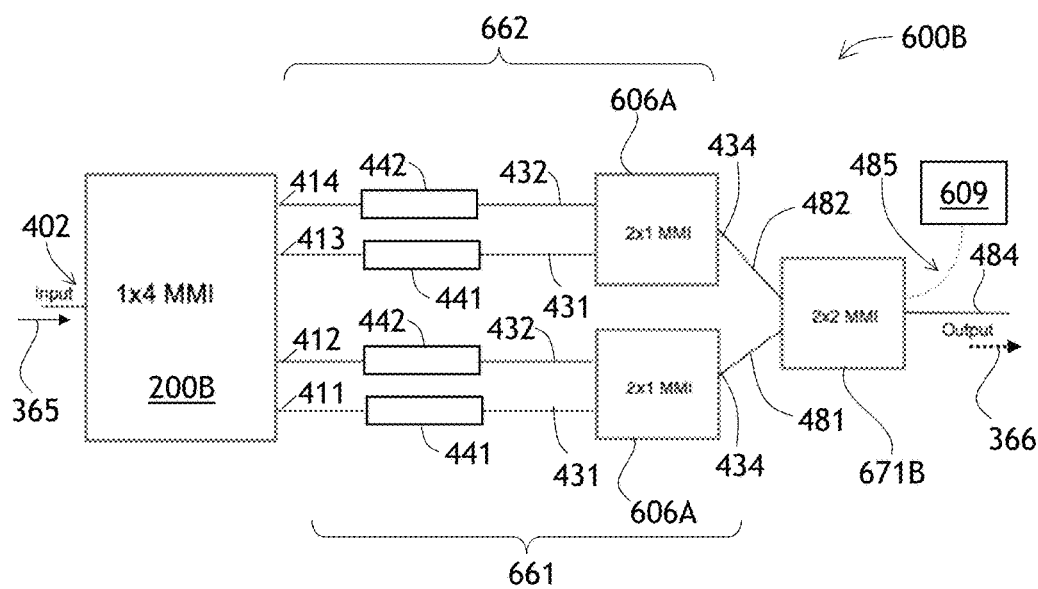
Figure 6C:
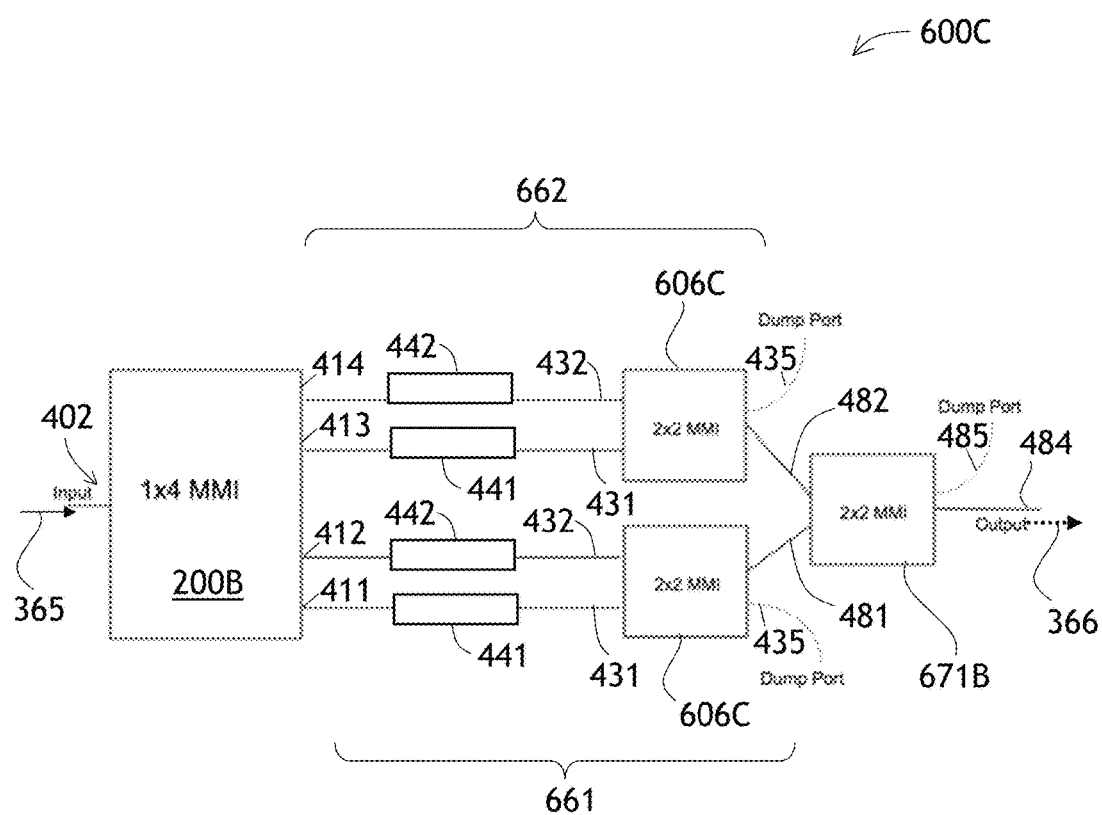

Referring to FIGS. 6A, 6B, and 6C with further reference to FIGS. 2B and 4, optical modulators 600A (FIG. 6A), 600B (FIG. 6B), and 600C (FIG. 6C) are embodiments of the optical modulator 400 (FIG. 4). Each of the optical modulators 600A-600C may include the 1×4 MMI splitter 200B (FIG. 2B) optically coupled at its input port to the input port 402, and optically coupled at its output ports to the output ports 411-414 (FIGS. 6A-6C). When connected this way, the 1×4 MMI splitter 200B (FIGS. 6A-6C) may perform the same function as the optical splitter 410 of the optical modulator 400 (FIG. 4).

Referring specifically to FIG. 6A, first 661 and second 662 Mach-Zehnder interferometers of the optical modulator 600A may each include a 2×1 MMI coupler 606A including the respective first 431 and second 432 ingress ports, and the egress port 434. The 2×1 MMI couplers 606A may perform the same function as the Mach-Zehnder combiners 406 of the optical modulator 400 of FIG. 4. The optical modulator 600A may further have an additional 2×1 MMI coupler 671A including the first 481 and second 482 inlet ports, and the first outlet port 484. The additional 2×1 MMI coupler 671A may perform the same function as the first optical combiner 471 of the optical modulator 400 of FIG. 4.

Turning specifically to FIG. 6B with further reference to FIG. 6A, the optical modulator 600B (FIG. 6B) differs form the optical modulator 600A (FIG. 6A) in that a first combiner of the optical modulator 600B (FIG. 6B) includes a 2×2 MMI coupler 671B having the first 481 and second 482 inlet ports, the first outlet port 484, and a second outlet port 485 for outputting residual light. For instance, 50% of the incoming light may be coupled to the second outlet port 485. A photodetector 609 may be optically coupled to the second outlet port 485 for detecting the residual light e.g. for bias control of Mach-Zehnder interferometers, and/or for diagnostic purposes. The split ratio of 2×2 MMI 671B of nearly 50% is preferable to allow for balanced optical power from the first 661 and second 662 Mach-Zehnder interferometers, to assure balanced phase and amplitude changes from the first 661 and second 662 Mach-Zehnder interferometers.

Turning specifically to FIG. 6C with further reference to FIG. 6B, the optical modulator 600C (FIG. 6C) differs form the optical modulator 600B (FIG. 6B) in that the Mach-Zehnder combiners include 2×2 MMI couplers 606C each having a second egress port 435 for outputting residual light, for example 50% of incoming light. Photodetectors, not shown, may be optically coupled to the second egress ports 435 for detecting the residual light. The optical modulators 700A-700C of FIGS. 7A-7C may be built using MMI couplers for coupling and splitting light. The split ratio of 2×2 MMI 606C should be preferably near 50% to allow for balanced optical power from the first 431 and second 432 waveguides, and to assure low chirp, which may cause an undesired orthogonal phase modulation from each Mach-Zehnder interferometer 661 and 662.

Figure 7:
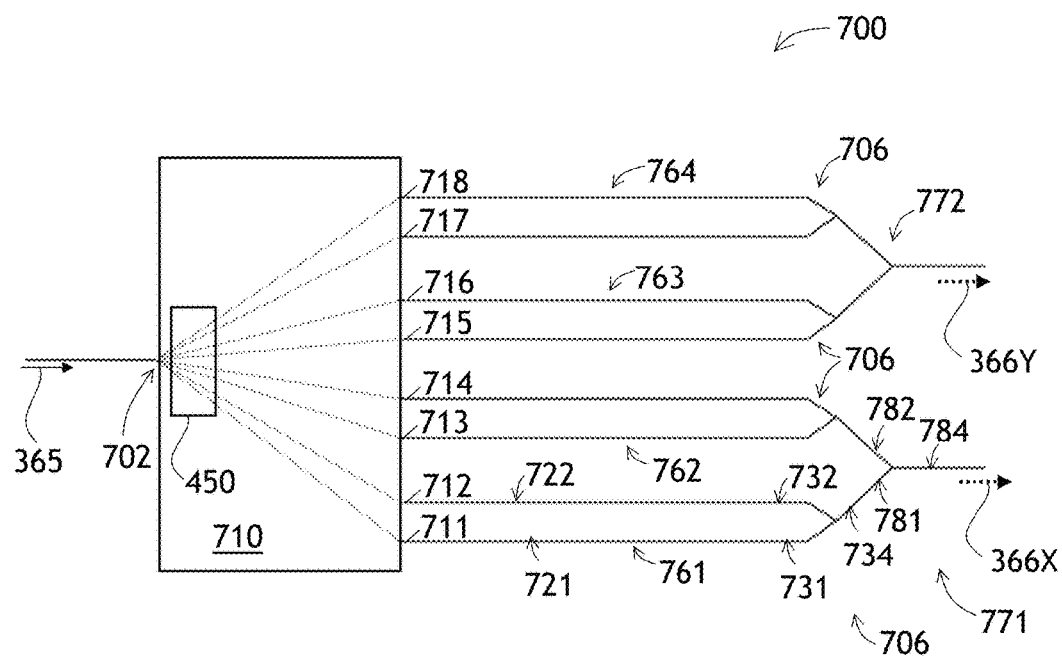
FIG. 7 illustrates a schematic view of a DP-QPMZ optical modulator including a MMI splitter.

Referring now to FIG. 7 with further reference to FIG. 4, an optical modulator 700 (FIG. 7) may be described as an extended version of the optical modulator 400 (FIG. 4). While the optical modulator 400 may be used for quadrature-phase modulation, the optical modulator 700 (FIG. 7) may be used for double polarization, quadrature-phase modulation, to provide modulated light 366X in an X-branch, and modulated light 366Y in an Y-branch. The optical modulator 700 may include an optical splitter 710 having an input port 702 and first 711, second 712, third 713, fourth 714, fifth 715, sixth 716, seventh 717, and eighth 718 output ports for splitting the input light 365. First 761, second 762, third 763, and fourth 764 Mach-Zehnder interferometers may be provided. Similarly to the first 461 and second 462 Mach-Zehnder interferometers of the optical modulator 400 (FIG. 4), each one of the first 761 to fourth 764 Mach-Zehnder interferometers (FIG. 7) of the optical modulator 700 may include first 721 and second 722 waveguides each optically coupled to a different one of the first 711 to eighth 718 output ports, a Mach-Zehnder combiner 706 including first 731 and second 732 ingress ports optically coupled to the first 721 and second 722 waveguides, respectively, and a first egress port 734. A phase shifter, not shown for brevity, may be provided for modulating optical phase of portion of the light 365 propagating in the first waveguide 721, the second waveguide 722, or both.

First 771 and second 772 optical combiners may be provided. Similarly to the first optical combiner 471 (FIG. 4), the first 771 and second 772 optical combiners (FIG. 7) may each include first 781 and second 782 inlet ports each optically coupled to a different one of the first egress ports 734 of the respective Mach-Zehnder combiners 706, and a first outlet port 784 for outputting the modulated light 366X and 366Y, respectively The modulated light 366X and 366Y may be modulated by phase shifters, not shown, of the first 761 to fourth 764 Mach-Zehnder interferometers.

Figure 8:
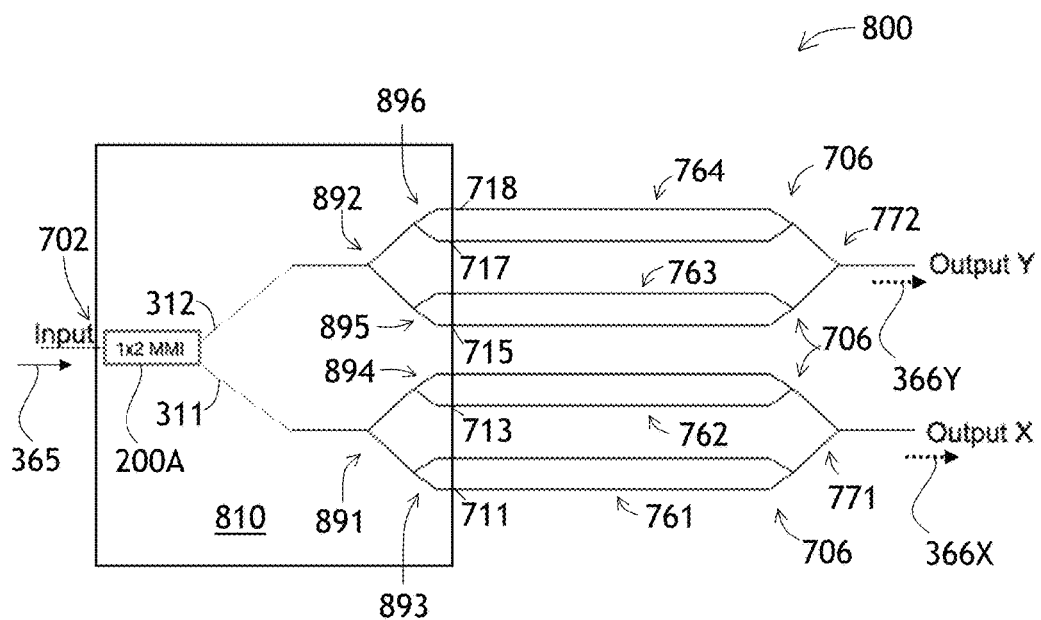
FIG. 8 illustrates a schematic view of the DP-QPMZ optical modulator of FIG. 7 including a 1×2 MMI splitter.

Turning to FIG. 8 with further reference to FIGS. 2A, 5, and FIG. 7, an optical modulator 800 (FIG. 8) is an embodiment of the optical modulator 700 (FIG. 7), and includes similar elements. An optical splitter 810 of the optical modulator 800 (FIG. 8) may include the 1×2 MMI optical splitter 200A (FIG. 2A) optically coupled to the input port 702 (FIG. 8), and first 891 and second 892 Y-splitters having the respective ingress ports optically coupled to the first 311 and second 312 output ports of the 1×2 MMI optical splitter 200A. The optical splitter 810 may further include third 893, fourth 894, fifth 895, and sixth 896 Y-splitters each including an ingress port optically coupled to a different one of the egress ports of the first 891 and second 892 Y-splitters, and two egress ports, so that each one of the egress ports of the third 893 to sixth 896 Y-splitters is coupled to a different one of the first 711 to eighth 718 waveguides. Optical phase shifters are omitted in FIG. 8 for brevity.

Figure 9:
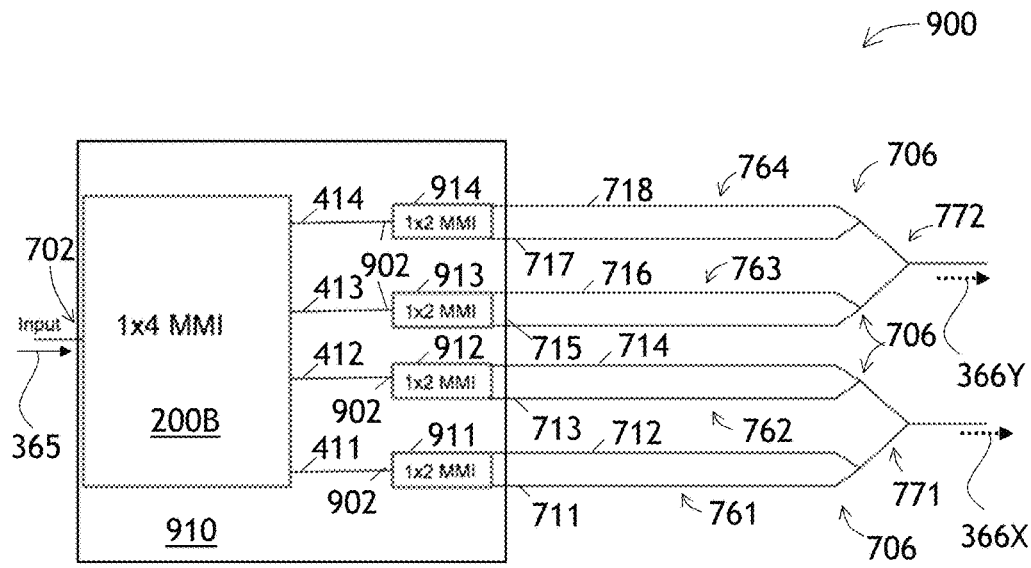
FIG. 9 illustrates a schematic view of the DP-QPMZ optical modulator of FIG. 7 including a 1×4 MMI splitter.

Referring now to FIG. 9 with further reference to FIGS. 2A, 2B, and FIG. 7, an optical modulator 900 (FIG. 9) is an embodiment of the optical modulator 700 (FIG. 7), and includes similar elements. An optical splitter 910 of the optical modulator 900 (FIG. 9) may include the 1×4 MMI splitter 200B (FIG. 2B) optically coupled to the input port 702 (FIG. 9). The optical splitter 910 may further include first 911, second 912, third 913, and fourth 914 1×2 Mach-Zehnder MMI splitters similar to 1×2 MMI splitters 200A of FIG. 2A. Each of the first 911, second 912, third 913, and fourth 914 1×2 Mach-Zehnder MMI splitters may include an input port 902 optically coupled to a different one of the first 411 to fourth 414 output ports of 1×4 MMI splitter 200B. The first Mach-Zehnder MMI splitter 911 may include the first 711 and second 712 output ports of the optical splitter 910; the second Mach-Zehnder MMI splitter 912 may include the third 713 and fourth 714 output ports of the optical splitter 910; the third Mach-Zehnder MMI splitter 913 may include the fifth 715 and sixth 716 output ports of the optical splitter 910; and the fourth Mach-Zehnder MMI splitter 914 may include the seventh 717 and eighth 718 output ports of the optical splitter 910. Phase shifters are not shown in FIG. 9 for brevity.

Turning to FIGS. 10A, 10B, 10C, and 10D with further reference to FIGS. 2C and 7, optical modulators 1000A (FIG. 10A), 1000B (FIG. 10B), 1000C (FIG. 10C), and 1000D (FIG. 10D) are embodiments of the optical modulator 700 (FIG. 7). Each of the optical modulators 1000A-1000D (FIGS. 10A-10D) may include the 1×8 MMI splitter 200C (FIG. 2C), optically coupled at its input port to the input port 702 (FIGS. 10A-10D), and at its output ports, one by one, to the first 711 to eighth 718 output ports. Connected in this way, the 1×8 MMI splitter 200C may perform the same function as the optical splitter 710 of the optical modulator 700 (FIG. 7).

Figure 10A:
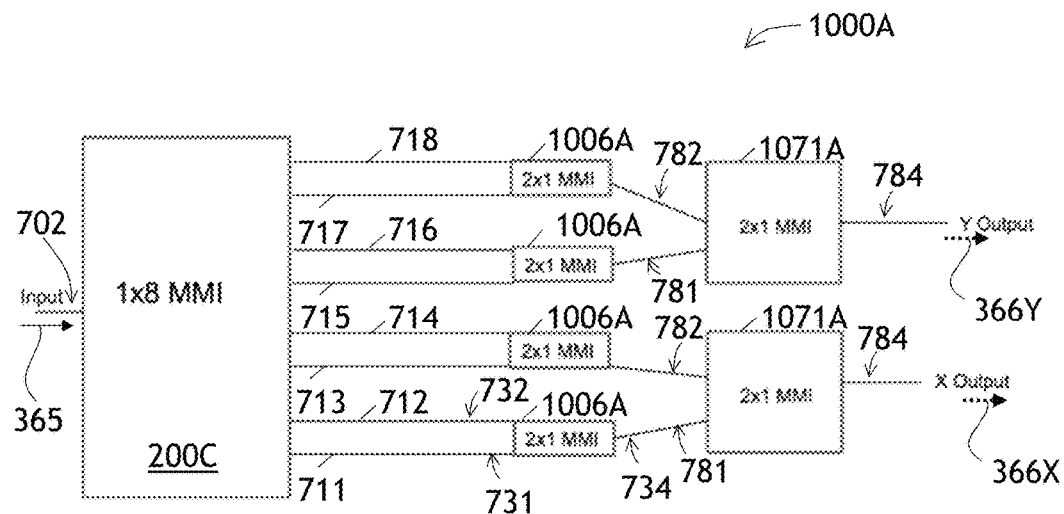
FIGS. 10A, 10B, 10C, 10D, and 10E illustrate a schematic view of the DP-QPMZ optical modulator of FIG. 7 including a 1×8 MMI splitter and various MMI combiners.
Figure 10B:
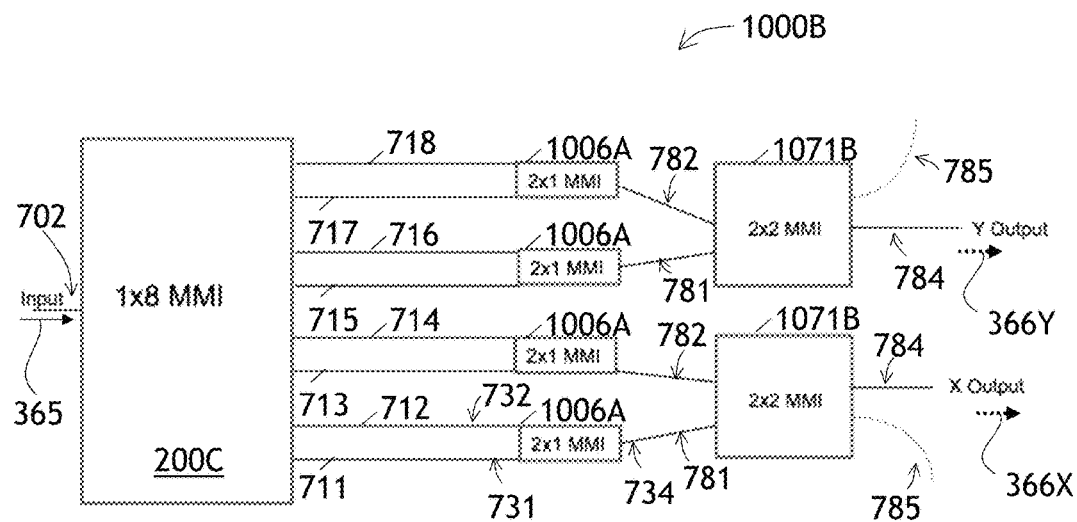

Referring specifically to FIGS. 10A and 10B with further reference to FIG. 7, each one of the Mach-Zehnder combiners 706 (FIG. 7) of the first to fourth Mach-Zehnder interferometers 761-764 may include a MMI coupler 1006A (FIGS. 10A, 10B) including the first 731 and second 732 ingress ports, and the first egress ports 734. Referring specifically to FIG. 10A with further reference to FIG. 7, each one of the first 771 and second 772 optical combiners is replaced in FIG. 10A with a 2×1 MMI coupler 1071A including the first 781 and second 782 inlet ports, and the first outlet ports 784.

Referring specifically to FIG. 10B with further reference to FIG. 10A, the optical modulator 1000B (FIG. 10B) differs form the optical modulator 1000A (FIG. 10A) in that each optical combiner of the optical modulator 1000B (FIG. 10B) includes a 2×2 MMI coupler 1071B including the first 781 and second 782 inlet ports, the first outlet port 784, and further including a second outlet port 785 for outputting residual light e.g. 50% of the incoming light. A photodetec-
tor, not shown, may be optically coupled to the second outlet port 785 for detecting the residual light e.g. for diagnostic purposes.

Figure 10C:
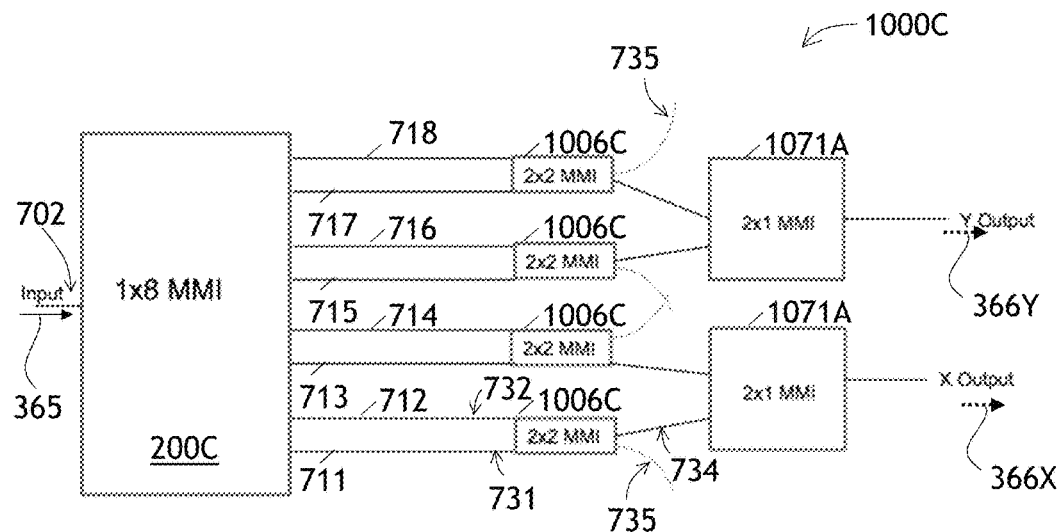
Figure 10D:
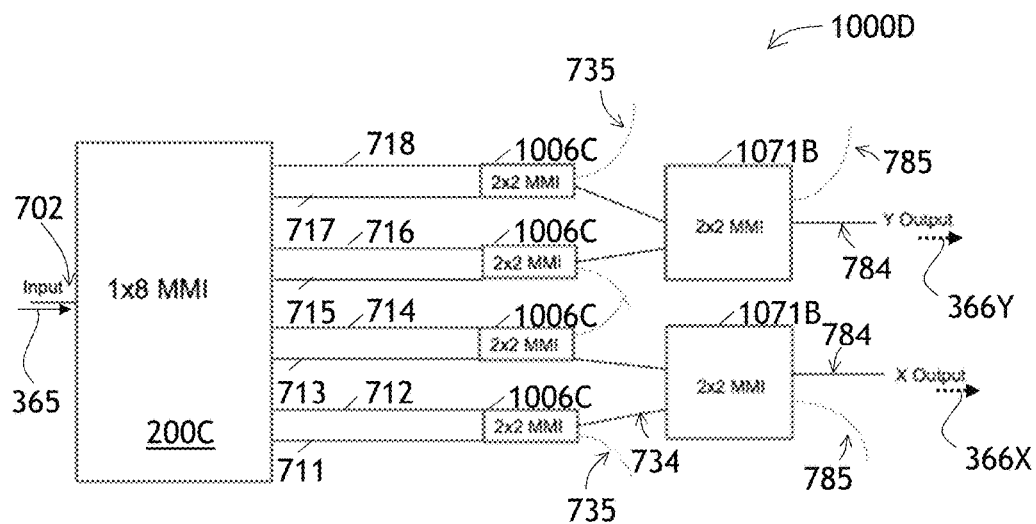

Referring specifically to FIG. 10C with further reference to FIG. 10A, the optical modulator 1000C (FIG. 10C) differs form the optical modulator 1000A (FIG. 10A) in that the Mach-Zehnder combiners include a 2×2 MMI coupler 1006C including the first 731 and second 732 ingress ports, the first egress port 734, and further including a second egress port 735 for outputting residual light e.g. 50% of the incoming light. A photodetector, not shown, may be optically coupled to the second egress port 735 for detecting the residual light e.g. for diagnostic purposes. Turning to FIG. 10D with further reference to FIGS. 10B and 10C, optical modulator 1000D (FIG. 10D) incorporates the first and second 2×2 MMI couplers 1071B and the Mach-Zehnder combiner 2×2 MMI couplers 1006C (FIG. 10C). Thus, the optical modulators 1000A-1000D of FIGS. 10A-10D may be built using MMI couplers for coupling and splitting light. Phase shifters are not shown in FIGS. 10A-10D for brevity.

Figure 10E:
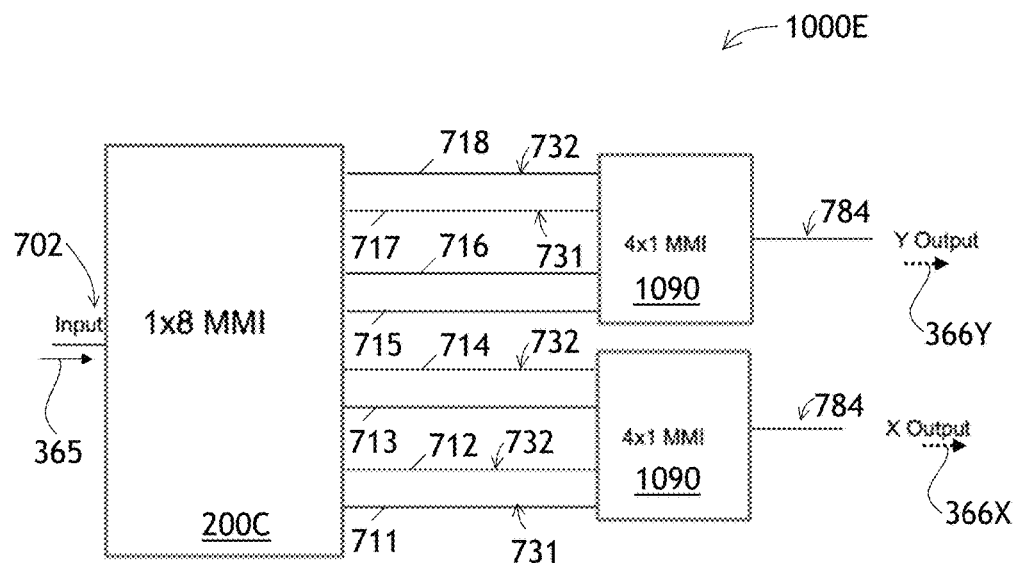

Turning now to FIG. 10E with further reference to FIG. 10A, an optical modulator 1000E (FIG. 10E) differs form the optical modulator 1000A (FIG. 10A) in that the two 2×1 MMI couplers 1006A and one 2×1 MMI coupler 1071A are replaced in the optical modulator 1000E (FIG. 10E) with a single 4×1 MMI coupler 1090. The 4×1 MMI coupler 1090 may facilitate a further size reduction of the optical modulator 1000E.

The optical splitting structures, such as the 1×2 MMI 200A of FIG. 2A, the 1×4 MMI 200B of FIG. 2B, the 1×8 MMI 200C of FIG. 2C, or the 1×N MMI 200D of FIG. 2D, of the optical splitter 410 of FIG. 4, the optical splitter 710 of FIG. 7, as the case may be, and the optical combining structures, such as the Mach-Zehnder combiners 406 and first optical combiners 471 of FIG. 4, including the 2×1 MMI couplers 606A and 671A of FIG. 6A, 2×2 MMI couplers 671 of FIG. 6B, 2×2 MMI couplers 606C of FIG. 6C, etc., may be disposed on separate or different substrates. By way of a non-limiting example, the substrates of the optical splitter 410, 710 and the first optical combiner 406, 471 may include silicon, indium phosphide, and gallium arsenide. Furthermore, the first 431 and second 432 waveguides of the first 461 and/or the second 462 Mach-Zehnder interferometer of FIGS. 4 and 5, as well as the first 631 and second 632 waveguides of the first 661 and/or the second 662 Mach-Zehnder interferometer of FIGS. 6A-6C may be disposed on a separate electro-optical substrate selected from the group consisting of lithium niobate, silicon, indium phosphide, and gallium arsenide.

Figure 10F:
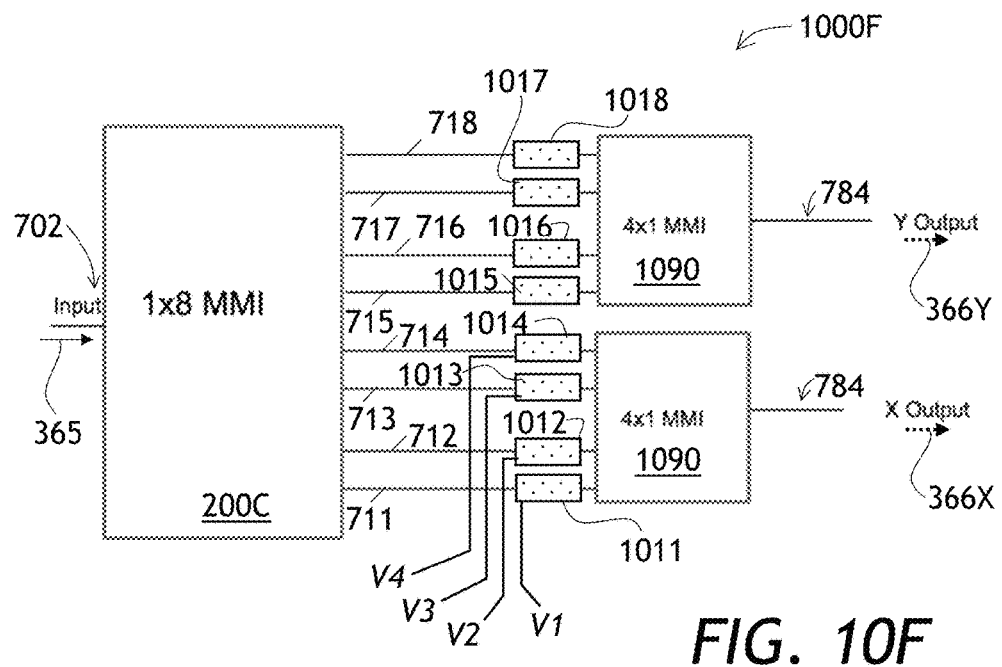
FIG. 10F illustrates a schematic view of the DP-QPMZ optical modulator of FIG. 10E, explicitly showing electrodes and bias voltages for X-branch of the DP-QPMZ optical modulator.
Figure 11:
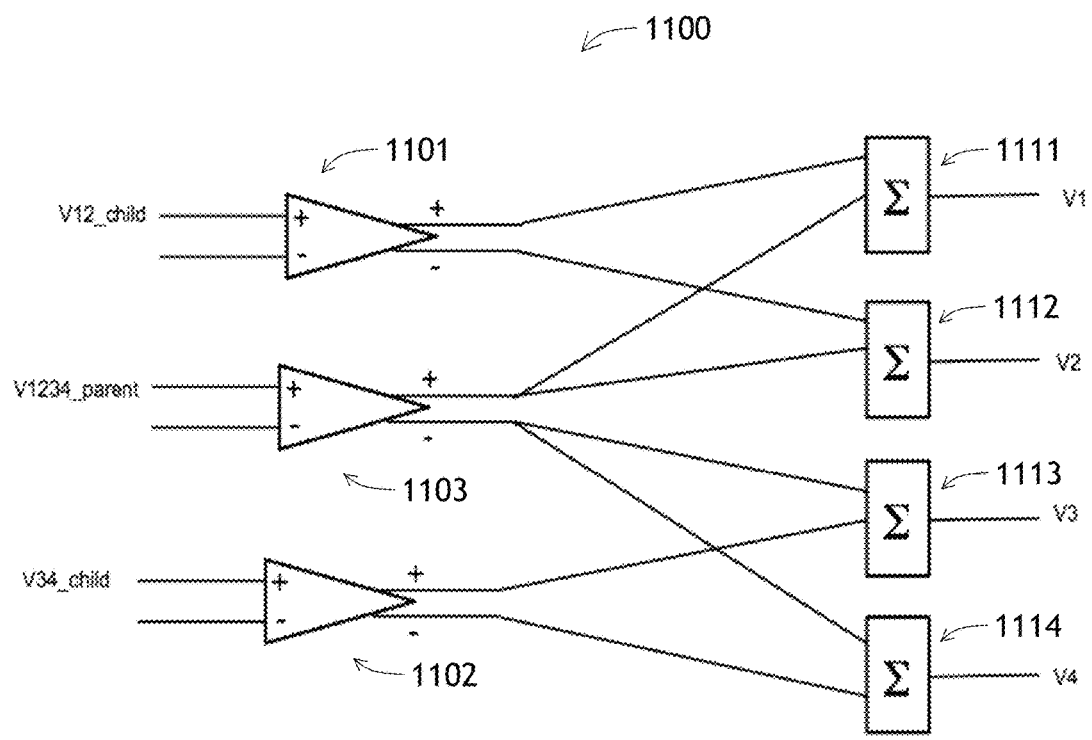
FIG. 11 illustrates a schematic view of a driver circuit for generating the bias voltages for application to the electrodes of the DP-QPMZ of FIG. 10F.

Referring back to FIG. 10A, electrodes (not shown) may be provided over output waveguides of the 2×1 MMI couplers 1006A, to adjust the optical phase of the respective pairs of the Mach-Zehnder interferometers 761-764 by applying corresponding bias voltages. A similar functionality may be provided for DP-QPMZ modulators of the present disclosure; by way of an illustrative example, referring to FIG. 10F, a DP-QPMZ modulator 1000F of FIG. 1OF is similar to the DP-QPMZ modulator 1000E of FIG. 10E. Bias electrodes 1011, 1012, 1013, 1014, 1015, 1016, 1017, and 1018 may be used to apply bias voltages V1, V2, V3, and V4 to the first four electrodes 1011-1014. Similar bias voltages may be also applied to the last four bias electrodes 1015-1018 (not shown for brevity). In FIG. 10F, only signal bias electrodes 1011-1018 are shown. Ground bias electrodes are not shown for brevity. Ground electrodes may be disposed along side or beneath the signal bias electrodes 1011-1018. Turning now to FIG. 11 with further reference to FIG. 10F, a bias controller 1100 for generating the bias voltages V1, V2, V3, and V4 may include first 1101, second 1102, and third 1103 amplifiers electrically coupled to first 1111, second 1112, third 1113 and fourth 1114 summation modules, as shown. To bias the Mach-Zehnder interferometer formed by the two bottom waveguides 711 and 712 (FIG. 10F), a bias voltage V12_child (FIG. 11) may be applied to the first amplifier 1101. To bias the Mach-Zehnder interferometer formed by the two next waveguides 713 and 714 (FIG. 10F), a bias voltage V34_child may be applied to the second amplifier 1102. To bias the pair of the above Mach-Zehnder interferometers formed by the four bottom waveguides 711-714, a bias voltage V1234_parent may be applied to the third amplifier 1103. In FIG. 11, the signs (+) and (−) denote non-inverting (+) and inverting (−) amplifier outputs. The bias controller 1100 may be implemented with conventional analog electronics or with the aid of a Digital Signal Processing (DSP) circuit combined with Analog-to-Digital (A to D) and Digital-to-Analog (D to A) converter circuits. Digital circuitry can facilitate tuning out minor differences in modulation efficiency of the individual bias electrode sections, allowing the bias controls to operate more independently, with reduced crosstalk between control signals.

An optical modulator of the present disclosure may further include a 1×N MMI optical splitter or coupler, wherein N≥2, preferably N≥4. The 1×N MMI optical splitter or coupler may have an input port for receiving light, and N output ports for outputting light. The 1×8 MMI splitter 200C of FIGS. 2C is an example of such a splitter for N=8. First through $(N/2)^{th}$ Mach-Zehnder interferometers of such a modulator may each include first and second waveguides each optically coupled to a different one of the first to $N^{th}$ output ports, and a first phase shifter operationally coupled to the first waveguide, for modulating optical phase of light propagating in the first waveguide. A plurality of optical combiners, for example the 4×1 MMI couplers 1090 (for N=8) may each include a plurality of inlet ports each optically coupled to a different one of the first and second waveguides of the first through N/2 Mach-Zehnder interferometers, and a first outlet port for outputting at least a portion of the light modulated by the first phase shifters of the corresponding Mach-Zehnder interferometers.

The plurality of optical combiners may include first and second optical combiners, for example the 4×1 MMI couplers 1090 of FIG. 10E, each including N/2 inlet ports, that is, four inlet ports in this example. Although not shown in FIG. 10E, each of the plurality of optical combiners, for example the 4×1 MMI couplers 1090, may include a second outlet port for outputting at least a portion of the light modulated by the first phase shifters of the corresponding Mach-Zehnder interferometers. For this embodiment, the optical modulator 1000E may include a plurality of photodetectors, not shown, each coupled to a different one of the second outlet ports of the plurality of the 4×1 MMI couplers 1090.

The present disclosure is not to be limited in scope by the specific embodiments described herein. Indeed, other various embodiments and modifications, in addition to those described herein, will be apparent to those of ordinary skill in the art from the foregoing description and accompanying drawings. Thus, such other embodiments and modifications are intended to fall within the scope of the present disclosure. Further, although the present disclosure has been described herein in the context of a particular implementation in a particular environment for a particular purpose, those of ordinary skill in the art will recognize that its usefulness is not limited thereto and that the present disclosure may be beneficially implemented in any number of environments for any number of purposes. Accordingly, the claims set forth below should be construed in view of the full breadth and spirit of the present disclosure as described herein.

What is claimed is:

1. An optical modulator comprising:
   an optical splitter comprising:
      an input port for receiving light;
      first to fourth output ports for outputting light; and
      a multimode interference optical splitter downstream of the input port for splitting the light received at the input port;
   first and second Mach-Zehnder interferometers, each comprising:
      first and second waveguides each optically coupled to a different one of the first to fourth output ports;
      a Mach-Zehnder combiner comprising:
         first and second ingress ports optically coupled to the first and second waveguides, respectively; and
         a first egress port; and
      a first phase shifter operationally coupled to the first waveguide, for modulating optical phase of light propagating in the first waveguide; and
   a first optical combiner comprising:
      first and second inlet ports each optically coupled to a different one of the first egress ports of the Mach-Zehnder combiners of the first and second Mach-Zehnder interferometers; and
      a first outlet port for outputting the light modulated by the first phase shifters of the first and second Mach-Zehnder interferometers, wherein
   each Mach-Zehnder combiner, of the first and second Mach-Zehnder interferometers, comprises a multimode interference coupler comprising the first ingress port, the second ingress port, the first egress port, and a second egress port.

2. The optical modulator of claim 1, wherein
   the multimode interference optical splitter is optically coupled to the input port,
   the multimode interference optical splitter comprises first and second outlet ports,
   the optical splitter further comprises first and second Y-splitters each comprising an ingress port optically coupled to a different one of the first and second outlet ports of the multimode interference optical splitter,
   the first Y-splitter comprises the first and second output ports of the optical splitter, and
   the second Y-splitter comprises the third and fourth output ports of the optical splitter.

3. The optical modulator of claim 1, wherein the multimode interference optical splitter is optically coupled to the input port and comprises the first to fourth output ports.

4. The optical modulator of claim 1, wherein the first optical combiner comprises a multimode interference coupler comprising the first and second inlet ports and the first outlet port.

5. The optical modulator of claim 1, wherein the multimode interference coupler further comprises a second outlet port for outputting residual light.

6. The optical modulator of claim 5, further comprising:
   a photodetector, optically coupled to the second outlet port, for detecting the residual light.

7. The optical modulator of claim 1, wherein the optical splitter and the first optical combiner are disposed on different substrates.

8. The optical modulator of claim 7, wherein the different substrates are selected from the group consisting of silicon, indium phosphide, and gallium arsenide.

9. The optical modulator of claim 1, wherein the first and second Mach-Zehnder interferometers each further comprise a second phase shifter, operationally coupled to the respective second waveguide, for modulating optical phase of light propagating in the respective second waveguide.

10. The optical modulator of claim 1, wherein
the optical splitter further comprises fifth to eighth output ports for outputting light, and
the optical modulator further comprises:
third and fourth Mach-Zehnder interferometers, each comprising:
first and second waveguides each optically coupled to a different one of the fifth to eighth output ports;
a Mach-Zehnder combiner comprising:
first and second ingress ports optically coupled to the first and second waveguides, respectively; and
a first egress port; and
a phase shifter, operationally coupled to the first waveguide, for modulating optical phase of light propagating in the first waveguide; and
a second optical combiner comprising:
first and second inlet ports each optically coupled to a different one of the first egress ports of the Mach-Zehnder combiners of the third and fourth Mach-Zehnder interferometers; and
a first outlet port for outputting the light modulated by the phase shifters of the third and fourth Mach-Zehnder interferometers.

11. The optical modulator of claim 10, wherein
the multimode interference optical splitter is optically coupled to the input port and comprises first and second outlet ports,
the optical splitter further comprises first and second Y-splitters each comprising an ingress port optically coupled to a different one of the first and second outlet ports of the multimode interference optical splitter and two egress ports,
the optical splitter further comprises third to sixth Y-splitters each comprising an ingress port optically coupled to a different one of the egress ports of the first and second Y-splitters and two egress ports, and
each one of the egress ports of the third to sixth Y-splitters is coupled to a different one of the first to eighth output ports.

12. The optical modulator of claim 10, wherein the multimode interference optical splitter is optically coupled to the input port and comprises the first to eighth output ports.

13. The optical modulator of claim 12, wherein each one of the Mach-Zehnder combiners, of the first to fourth Mach-Zehnder interferometers, comprises a multimode interference coupler comprising the first and second ingress ports and the first egress port.

14. The optical modulator of claim 13, wherein each one of the multimode interference couplers of the Mach-Zehnder combiners, of the first to fourth Mach-Zehnder interferometers, further comprises a second egress port for outputting residual light.

15. The optical modulator of claim 14, wherein each one of the first and second optical combiners comprises a multimode interference coupler comprising the first and second inlet ports and the first outlet port.

16. The optical modulator of claim 13, wherein each one of the first and second optical combiners comprises a multimode interference coupler comprising the first and second inlet ports and the first outlet port.

17. The optical modulator of claim 12, wherein the multimode interference optical splitter comprises a taper portion optically coupled to the input port, and an interference portion optically coupled to the first to eighth output ports.

18. The optical modulator of claim 10, wherein
the multimode interference optical splitter is optically coupled to the input port and comprises first to fourth outlet ports,
the optical splitter further comprises first to fourth Mach-Zehnder multimode interference splitters each comprising an ingress port optically coupled to a different one of the first to fourth outlet ports of the multimode interference optical splitter,
the first Mach-Zehnder multimode interference splitter comprises the first and second output ports of the optical splitter,
the second Mach-Zehnder multimode interference splitter comprises the third and fourth output ports of the optical splitter,
the third Mach-Zehnder multimode interference splitter comprises the fifth and sixth output ports of the optical splitter, and
the fourth Mach-Zehnder multimode interference splitter comprises the seventh and eighth output ports of the optical splitter.

19. The optical modulator of claim 1, wherein the first and second waveguides of each Mach-Zehnder interferometer are disposed on a substrate selected from the group consisting of lithium niobate, silicon, indium phosphide, and gallium arsenide.

20. An optical modulator comprising:
a multimode interference optical splitter comprising an input port for receiving light and first to $N^{th}$ output ports for outputting light, for splitting the light received at the input port, wherein N is an integer;
first through $(N/2)^{th}$ Mach-Zehnder interferometers, each comprising:
first and second waveguides each optically coupled to a different one of the first to Nth output ports; and
a first phase shifter, operationally coupled to the first waveguide, for modulating optical phase of light propagating in the first waveguide; and
a plurality of optical combiners, each comprising:
a plurality of inlet ports each optically coupled to a different one of the first and second waveguides of the first through (N/2)th Mach-Zehnder interferometers; and
a first outlet port for outputting at least a portion of the light modulated by the first phase shifters of a corresponding Mach-Zehnder interferometer of the first through $(N/2)^{th}$ Mach-Zehnder interferometers, wherein
each of the plurality of optical combiners further comprises a second outlet port for outputting at least a portion of the light modulated by the first phase shifters of the corresponding Mach-Zehnder interferometers, and
the optical modulator further comprises a plurality of photodetectors, each coupled to a different one of the second outlet ports of the plurality of optical combiners.

21. The optical modulator of claim 20, wherein the plurality of optical combiners comprises first and second optical combiners each comprising N/2 inlet ports.

22. An optical modulator comprising:
an optical splitter comprising:
an input port for receiving light;
first to fourth output ports for outputting light; and
a multimode interference optical splitter downstream of the input port for splitting the light received at the input port;
first and second Mach-Zehnder interferometers, each comprising:
first and second waveguides each optically coupled to a different one of the first to fourth output ports;
a Mach-Zehnder combiner comprising:
first and second ingress ports optically coupled to the first and second waveguides, respectively; and
a first egress port; and
a first phase shifter operationally coupled to the first waveguide, for modulating optical phase of light propagating in the first waveguide; and
a first optical combiner comprising:
first and second inlet ports each optically coupled to a different one of the first egress ports of the Mach-Zehnder combiners of the first and second Mach-Zehnder interferometers; and
a first outlet port for outputting the light modulated by the first phase shifters of the first and second Mach-Zehnder interferometers, wherein
the multimode interference optical splitter is optically coupled to the input port,
the multimode interference optical splitter comprises first and second outlet ports,
the optical splitter further comprises first and second Y-splitters each comprising an ingress port optically coupled to a different one of the first and second outlet ports of the multimode interference optical splitter,
the first Y-splitter comprises the first and second output ports of the optical splitter, and
the second Y-splitter comprises the third and fourth output ports of the optical splitter.

23. The optical modulator of claim 22, wherein
the first optical combiner comprises a multimode interference coupler comprising the first and second inlet ports and the first outlet port, and
the multimode interference coupler further comprises a second outlet port for outputting residual light.

24. The optical modulator of claim 22, wherein the first and second Mach-Zehnder interferometers each further comprise a second phase shifter, operationally coupled to the respective second waveguide, for modulating optical phase of light propagating in the respective second waveguide.

25. The optical modulator of claim 22, wherein
the optical splitter further comprises fifth to eighth output ports for outputting light, and
the optical modulator further comprises:
third and fourth Mach-Zehnder interferometers, each comprising:
first and second waveguides each optically coupled to a different one of the fifth to eighth output ports;
a Mach-Zehnder combiner comprising:
first and second ingress ports optically coupled to the first and second waveguides, respectively; and
a first egress port; and
a phase shifter, operationally coupled to the first waveguide, for modulating optical phase of light propagating in the first waveguide; and
a second optical combiner comprising:
first and second inlet ports each optically coupled to a different one of the first egress ports of the Mach-Zehnder combiners of the third and fourth Mach-Zehnder interferometers; and
a first outlet port for outputting the light modulated by the phase shifters of the third and fourth Mach-Zehnder interferometers.

26. The optical modulator of claim 22, wherein
the multimode interference optical splitter is optically coupled to the input port and comprises first and second outlet ports,
the optical splitter further comprises first and second Y-splitters each comprising an ingress port optically coupled to a different one of the first and second outlet ports of the multimode interference optical splitter and two egress ports,
the optical splitter further comprises third to sixth Y-splitters each comprising an ingress port optically coupled to a different one of the egress ports of the first and second Y-splitters and two egress ports, and
each one of the egress ports of the third to sixth Y-splitters is coupled to a different one of the first to eighth output ports.

\* \* \* \* \*